US012801850B2

(12) United States Patent
Cernile et al.

(10) Patent No.: US 12,801,850 B2
(45) Date of Patent: Nov. 17, 2026

(54) DEEP CONCEPT SEARCH SYSTEMS AND METHODS

(71) Applicant: Inspirata, Inc., Tampa, FL (US)

(72) Inventors: George Cernile, Bolton (CA); James Shu Hen Chen, Toronto (CA)

(73) Assignee: Inspirata, Inc., Tampa, FL (US)

( * ) Notice: Subject to any disclaimer, the term of this patent is extended or adjusted under 35 U.S.C. 154(b) by 215 days.

(21) Appl. No.: 18/679,620

(22) Filed: May 31, 2024

(65) Prior Publication Data

US 2024/0403561 A1 Dec. 5, 2024

Related U.S. Application Data

(60) Provisional application No. 63/470,780, filed on Jun. 2, 2023.

(51) Int. Cl.
*G06F 40/284* (2020.01)

(52) U.S. Cl.
CPC .................................. *G06F 40/284* (2020.01)

(58) Field of Classification Search
CPC ..................................................... G06F 40/284
See application file for complete search history.

(56) References Cited

U.S. PATENT DOCUMENTS 7,756,859 B2 * 7/2010 Simonyi ........... G06F 16/90344 707/718
8,930,372 B2 * 1/2015 Terui ..................... G06F 16/313 707/711
11,645,447 B2 * 5/2023 Yerebakan ............ G06F 40/126 715/200
2008/0077570 A1 * 3/2008 Tang ................... G06F 16/3346 707/999.005
2013/0232172 A1 * 9/2013 Wood ................ G06F 16/90344 707/E17.014
2020/0126663 A1 * 4/2020 Lucas .................... G06Q 40/08

FOREIGN PATENT DOCUMENTS

CA 3160683 A1 * 6/2021 ........... H04L 47/215
CN 1477564 A * 2/2004 ........... G06F 16/328
CN 112308122 A * 2/2021 ....... G06F 18/24147
CN 114692630 A * 7/2022 ........... G06F 40/216

* cited by examiner

*Primary Examiner* — Paras D Shah
*Assistant Examiner* — Mulugeta Tuji Dugda
(74) *Attorney, Agent, or Firm* — Thomas Joseph

(57) ABSTRACT

A tokenization operation is performed on a document to divide the document into word tokens and to assign a heuristic segmentation index to the word tokens forming a tokenized text. An input text is received. The tokenized text or the input text is searched to find search parameters. When the search parameters are matched, a partial concept record is either created or updated. Input and searching continues until all search parameters are found, so that output can generated indicating that a concept match has occurred.

19 Claims, 8 Drawing Sheets

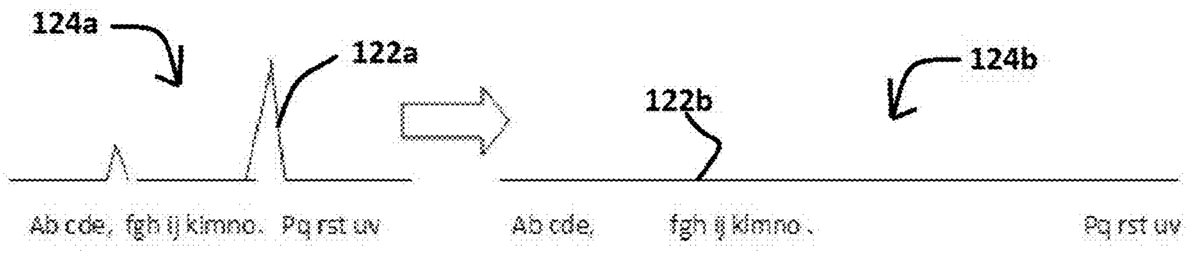

Example: Word co-ordinates only

The brown fox jumped over the small hill and landed on the green grass, however he missed the quick rabbit.
1 2 3 4 5 6 7 8 9 10 11 12 13 14 15 16 17 18 19 20

Some partial segments with example scores (for illustration only - not real scores)

and = 20
, = 8
However = 20
Period = 100

Super impose the segment scoring on word co-coordinates

Super imposed co-ordinates:

The brown fox jumped over the small hill and landed on the green grass, however he missed the quick rabbit. Continue..
1 2 3 4 5 6 7 8 9 10 11 12 13 14 15 16 17 18 19 20 21
20 8 20 100

Cumulative Co-ordinates

The brown fox jumped over the small hill and landed on the green grass, however he missed the quick rabbit. Continue..
1 2 3 4 5 6 7 8 29 30 31 32 33 34 63 64 65 66 67 68 189 ....

FIG. 2

```
The test results are negative for SMA, desmin,
1   2    3       4   5        6   7     11

MUC4, S100 and SOX10, and EMA result is positive.
15    19   20  21     25  26  27     28 29

Please note, this is a preliminary diagnosis
50     51    53   56 5758          59

and more tests are required to confirm this report.
60  61   62    63  64       65 66      67   68
```

DEEP CONCEPT SEARCH SYSTEMS AND METHODS

CROSS REFERENCE TO RELATED APPLICATION

This application claims the benefit under 35 U.S.C. § 119(c) of U.S. Provisional Application No. 63/470,780 entitled “DEEP CONCEPT SEARCH SYSTEMS AND METHODS” filed Jun. 2, 2023, which is incorporated herein by reference.

BACKGROUND ART

Various attempts at processing natural language or English-like sentences within electronic documents have been made for documents that have varying degrees of complexity. Some attempts have not resulted in systems that have the ability to have a deep understanding, but such attempts have resulted in improved overall system usability. Systems with an easy to use or English like syntax are, however, quite distinct from systems that use a rich lexicon and include an internal representation (often as first order logic) of the semantics of natural language sentences.

Approaches involve methods for identifying lexical expressions from a collection of keywords where the text is not necessarily formatted in English grammar often gives rise to combinatorial complexity when the expressions are not contiguous. The required data is often in ad-hoc notes, lists or tables and can be spread across whole sentences intermixed with other expressions.

Further, a set of keywords can be associated with multiple expressions within electronic documents. As a result, the task of finding correct expressions using multiple keywords can be challenging.

Indeed, the accuracy of utilizing conventional keyword searches is questionable, especially when searching technical documents, including documents that include medical terminology. Conventional keyword searching also provides limited context determination and can be difficult to implement. For example, achieving high accuracy is difficult when complex case-finding criteria is necessary.

Another approach is to use statistical searches. However, the level of granularity associated with the case-finding criteria requires a large body of knowledge to train the model. Further, such techniques are more rigid because rules cannot be changed when needed. Additionally, the search tool cannot explain its reasoning as to why a particular document is selected. A final problem with conventional statistical searches is that any change in rules or coding requires a new training set, which may not exist. Accordingly, there remains a need, in the fields of computer learning and understanding, including computerized natural language understanding, for improved technologies that may facilitate the searching of deep concepts within medical documents and other similarly structured documents.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a method is performed by one or more processors of a system. A document is received in memory. A tokenization operation is performed on the document to divide the document into a plurality of word tokens, to assign at least one heuristic segmentation index to each of the plurality of word tokens, and to form a tokenized text. An input text having an expression with at least one search parameter therein is received through input into the system with the at least one search parameter being one of a plurality of partial concept search parameters. At least one of the tokenized text and the input text is searched for a parameter match when the at least one search parameter is located in the input text. At least one of the plurality of word tokens and the assigned at least one heuristic segmentation index that corresponds to the parameter match is identified. A partial concept list is searched for a partial concept record for the expression. A partial concept record is created on the partial concept list for the parameter match, the at least one of the plurality of word tokens, and the associated at least one heuristic segmentation index when there is no existing partial concept for the expression. The partial concept record is updated on the partial concept list for the parameter match, the at least one of the plurality of word tokens, and the associated at least one heuristic segmentation index when an existing partial concept record is found. Output indicating that a concept match has occurred is generated when the partial concept list has a partial concept record for each of the plurality of partial concept search parameters. The concept match corresponds to a completed concept record.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 2 illustrates heuristic segmentation indices generated by a heuristic segmentation process.

DETAILED DESCRIPTION

Figure 1:
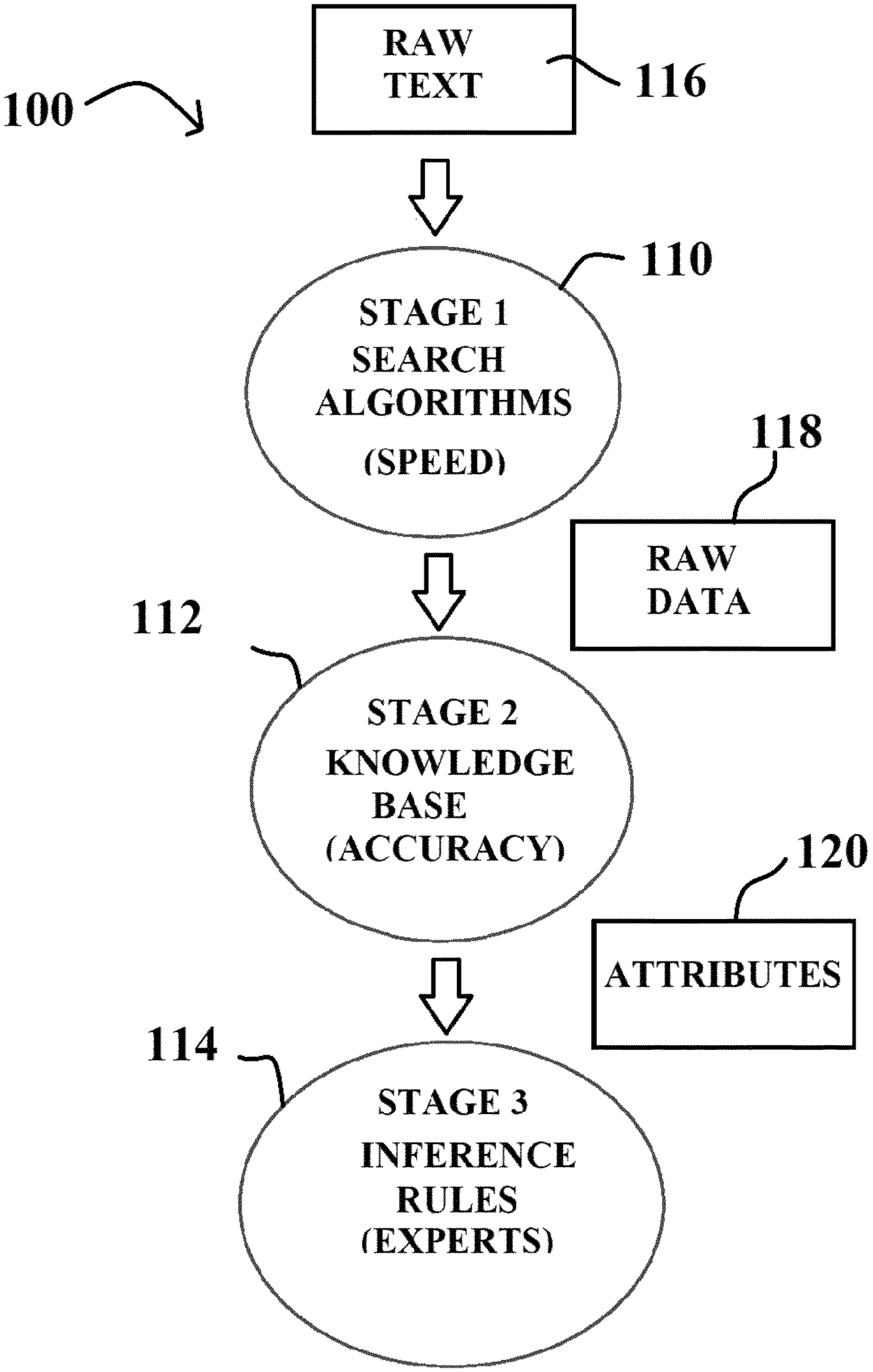
FIG. 1 is a flow chart of an exemplary artificial intelligence engine in accordance with the subject disclosure.

The subject disclosure is directed to deep concept search systems and methods and, more particularly, to deep concept search systems and methods with heuristic segmentation. The systems and methods utilize efficient concept identification with the ability to resolve conflicting or incorrect matching to questions and answers is required for the processing engine to achieve high accuracy and speed.

In one exemplary embodiment, a method is performed by one or more processors of a system. A document is received in memory. A heuristic segmentation operation is performed on the document via a moving search window to dynamically create a new index system on top of the normal keyword index count. Expressions each having at least one search parameter is defined in the lexicon (or knowledge base) of the system. In such embodiments, the knowledge base can include more information than the lexicon.

The entities within the search window are searched to identify concept matches when all the search parameters of the expression are located within the search window. A partial concept record is created on a partial concept list for the search parameter match with each partial concept record having the corresponding heuristic segmentation index. Each partial concept record on the partial concept list is compared to delete a partial concept record when the at least one coordinate that corresponds to the partial concept falls outside of the dynamic window boundary to produce a pruned partial concept list. Output indicating that a concept match has occurred is generated when the pruned partial concept list includes at least one partial concept record has all the required search parameters populated.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

As indicated above, the subject deep concept search systems and methods utilize efficient concept identification with the ability to resolve conflicting or incorrect matching to questions and answers is required for the processing engine to achieve high accuracy and speed. The disclosed systems and methods represent a new algorithmic and knowledge-based approach to searching. A concept can be a semantic concept that represents a unit of meaning of a specific idea or concept.

The new systems and methods can handle any level of granularity with respect to document content, so that complex rules can be implemented. The systems and methods can be used on multiple report types, including pathology, central nervous system (CNS), chest imaging, and any types of text document with the appropriate domain knowledge base.

Changes can be implemented with the new systems and methods quickly. There is no need for training set, as compared to conventional artificial intelligence or machine learning systems. The systems and methods can compare testing against published rules (where available for specific domains), so that problems can be identified quickly.

The disclosed systems and methods implement a novel approach to quickly identify concepts within a text document with context detection, such as negation. Further, the systems and methods facilitate the correct mapping between concept labels (attributes) and associated values for dictionary-based concepts and for assigning the correct values in numeric processing.

The systems and methods have five components, namely heuristic segmentation, keyword searching and concept building, concept resolution by simultaneous growing and pruning, negation, and heuristic score calculation. These systems and methods can be implemented using a computer, computer system, and/or computing device and can be configured as a special purpose computer or a general-purpose computer specifically programmed to perform the disclosed methods. Further, it is to be appreciated these features can be implemented by various types of operating environments, computer networks, platforms, frameworks, computer architectures, and/or computing devices, including, but not limited, cloud-based computer systems.

The systems and methods produce data that include an associated heuristic score for each expression. When conflicting answers are found, the confidence score can be used to determine the correct answer.

Further, the systems and methods provide information, so that inferred knowledge can be derived through inferencing rules. For example, when analyzing oncology reports, the systems and methods can be used to find the primary site of a tumor when multiple anatomical sites are mentioned within a report. This type of analysis generally requires human expertise to analyze several data points within a report and relies upon accurate attribute/value matching and confidence values to obtain faster and more accurate results.

The systems and methods, when implemented, provide substantial improvements in the performance of natural language processing of oncology reports, but the systems and methods have applications in other fields.

Referring now to the drawings and, in particular, to FIGS. 1, an artificial intelligence engine, generally designated by the numeral 100, having three stages 110-114. At the first stage 110, the engine 100 utilizes search algorithms to process raw text 116 within a text document stored in memory on a computer system or computing device. In this exemplary embodiment, the text document is an oncology report.

The engine 100 can generate a substantial amount of data from the raw text 116. The engine 100 uses heuristics to find concepts and numeric values within the raw text 116 in a faster and more efficient manner than can be achieved through conventional searching methods.

The engine 100 performs general pre-processing operations on the raw text 116 within the first stage 110. Then, the engine 100 performs segmentation operations to divide the raw text 116 into segments. Then, a concept search can be performed within the first stage 110.

The engine 100 produces raw data 118 at the first stage 110. The raw data 118 is sent to the second stage 112 for subsequent processing. At the second stage 112, the engine 100 accesses a knowledge base to improve the accuracy of the concept search results contained within the raw data 118.

The engine 100 tests and refines the raw data 118 against a knowledgebase by removing unwanted information at the second stage 112. The engine 100 can utilize negation, the removal of subset concepts, the removal of duplicate concepts, and concept scoring within the second stage 112. The engine 100 performs heuristic data refinement within the second stage 112.

The engine 100 produces attributes 120 at the second stage 112. The attributes 120 are sent to the third stage 114. The engine 100 utilizes inference rules at the third stage 114 to infer properties from the attributes 120. The inference rules represent expert capabilities that provide the engine 100 with the ability to infer properties such as reportability. The engine 100 can perform tumor classification (CNS) with a classifier, expert coding, machine learning, and other similar functions at the third stage 114.

The engine 100 utilizes heuristic segmentation to modify the distances between word tokens from a simple word count approach to a new co-ordinate system. It generates a list of heuristic segmentation indices that are used as input for determining the preliminary confidence of semantic expressions found in the input text. In some embodiments, a co-ordinate can be a heuristic segmentation index.

The engine 100 finds segment delimiters (including, period, comma, and other similar text structures) from the input text and assign scores to them. A positive score represents an increase in distance between word tokens in the input text. This is analogous to a hill 122*a* between two word tokens. The height of each hill 122*a* is indicated by the score, which represents the extra distance between the word tokens. The hill terrain 124*a* is then collapsed into a flat terrain to illustrate the increase in distance between the word tokens, as shown in FIG. 2.

The engine 100 utilizes a heuristic index system to determine a size cut-off or threshold for individual concepts and for negation operations. The use of the co-ordinate system diverges from traditional segmentation operations and provides the added benefit of partial (or cumulative) segmentation.

The co-ordinate system is also used by the engine 100 to calculate the heuristic score that is used to rank concepts. The cumulative distance can be combined with other scoring parameters to determine fitness of a concept. This fitness scoring has several purposes in subsequent processing. For example, the scores can be used to prune expressions with low fitness.

Each potential concept now has regular co-ordinates that correspond to the actual positions of the potential concepts within the text, as well as cumulative co-ordinates (CC) which represent the cumulative concept size for a potential concept. When the difference between the maximum cumulative co-ordinate and the minimum cumulative co-ordinate is above a predetermined cutoff or threshold, then the concept is not valid and can be pruned from a list of potential concepts.

The engine 100 utilizes thresholds and score to adjust for different deep search scenarios. For example, if the engine 100 identifies a table, the values can change or new partial segmenters can be introduced that only fall within a scope inside the table. Segmenters or segment components can be segment delimiters.

The engine 100 derives co-ordinate values for each concept allow for relative scoring and comparison of similar concepts. The engine 100 can use the score to assign relative heuristic score based on distance. The engine 100 can use the score to determine the best-fit concept when more than one fitting concept is found.

The score can be used as a measure of validity of concept in downstream processing. The engine 100 can use the score to determine the best concept for matching attributes to values, such as matching questions to answers. The engine 100 can use the score to resolve concepts when there are conflicting results.

The engine 100 can combine the distance score with other measures to calculate a total heuristic score for each concept.

Figure 3:
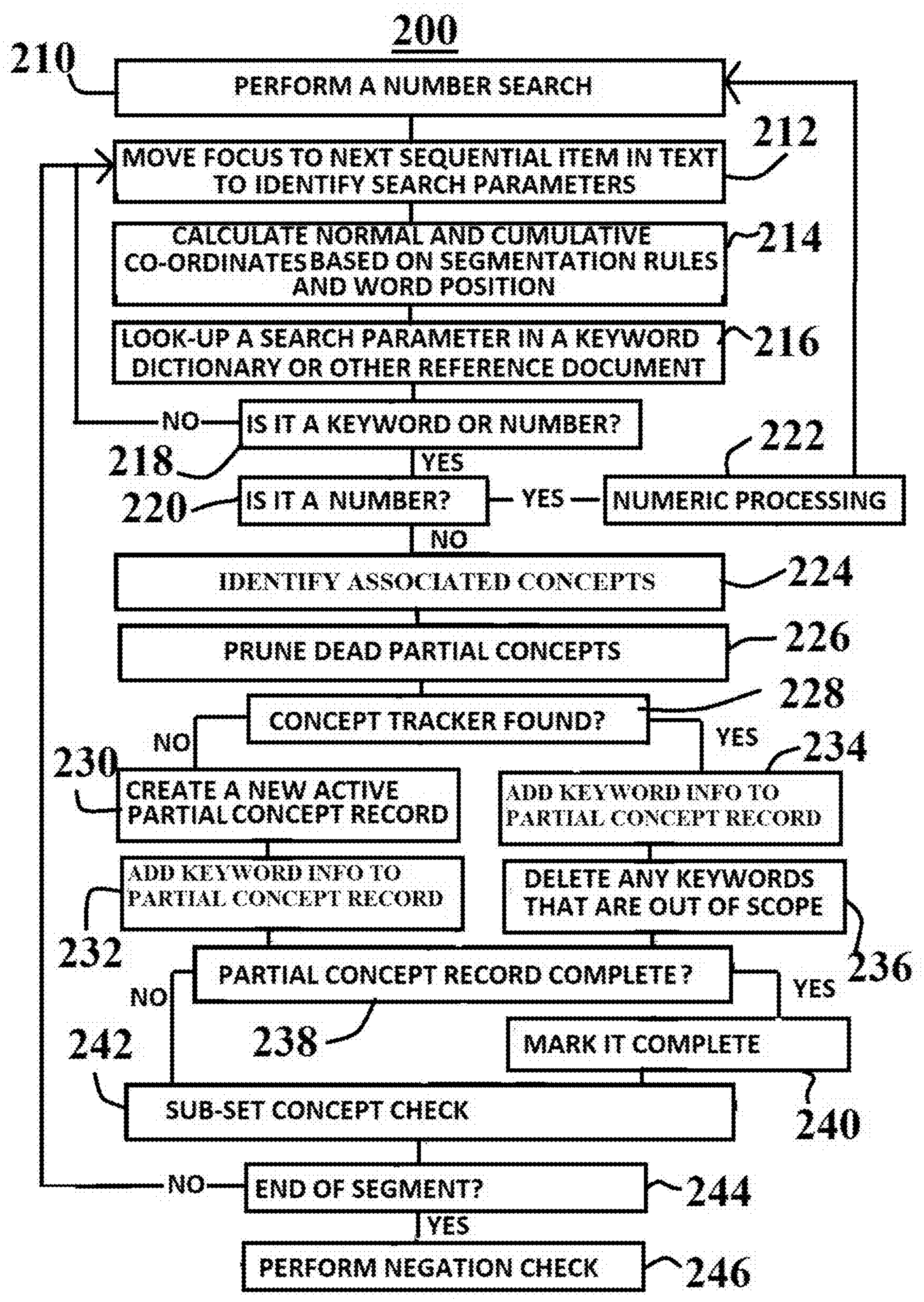
FIG. 3 is an exemplary process utilized by the artificial intelligence engine shown in FIG. 1.

Referring now to FIG. 3 with continuing reference to the foregoing figures, the operation of the concept search component of the engine 100 shown in FIG. 1 is shown as a process, generally designated with the numeral 200. In this exemplary embodiment, the process 200 includes a concept search. The concept search can include keyword searches and concept building functions.

Keyword searching is utilized when expressions contain one or more keywords. A concept is "found" if all its keywords are located within an acceptable boundary, as defined by a predetermined heuristic segmentation scheme. The mapping of keywords to expressions can be done using any suitable method. In this exemplary embodiment, each keyword has a list (or links) to a concept definition to which it belongs.

In some embodiments, text searching begins with the first word and progresses one word at a time to the end of the document. As each word is read from the text, a lookup of keywords is performed to check if it is in fact a keyword. This can be implemented as a hash table or tree structure for speed.

In other embodiments, the process 200 can begin with an optional step at Step 210. The optional step is an initial number search. The initial number search can be used to identify all numbers before performing the remaining steps of the process 200.

Once the number search is complete, the engine 100, shown in FIG. 1, can focus on the next sequential item in a text document at Step 212. At Step 212, the engine 100 can identify words, segmenters, numbers, or other similar search parameters.

As shown in FIG. 3, the engine 100 can calculate normal and cumulative co-ordinates based on segmentation rules and word position at Step 214. Then, the engine 100 will look-up the search parameter in a keyword dictionary or other reference document at Step 216. When the search parameter is a keyword and the reference document is a keyword dictionary, the engine 100 can apply suffix reduction.

A search parameter can be a lexical term (i.e., individual words or abbreviations), a semantic element or a searchable entity. Search parameters can be keywords, a number, a range of numbers, a string pattern or a concept. A number or range of numbers can be searched with or without units. A string pattern can be expressed as a regular expression or in a similar type of conveyance of information.

The engine 100 will check to see if the search parameter is a keyword, a number, or other search parameter type at Step 218. If the search parameter is not a keyword or a number, the engine 100 will return to Step 212. If the search parameter is a number, the engine 100 will perform numeric processing at Step 222 and return to optional Step 210.

If the search parameter is a keyword, the engine 100 will identify, from the lexical knowledge base, all concepts and their lexical expressions that are associated with the keyword at Step 224. A partial concept record represents an expression tracker without all the searchable entities having been found. A completed concept record represents an expression tracker with all the searchable entities having been found.

At Step 226, the engine 100 will prune dead partial concepts. Step 226 is an optional step. Through the pruning process, the engine 100 can further increase efficiency by removing a partial concept if all its internal keywords are past their prime, as defined by the heuristic cutoff distance.

This efficiency-saving option requires the engine 100 to check each partial concept during iteration through the partial concept list. This option is not efficient for a small number of concepts, but can be utilized with larger sets. In some embodiments, the partial concept can remain in the list and can be marked as void. Such embodiments still require a comparison each time.

At Step 228, the engine 100 determines whether the partial concept record for each of the lexical expressions (identified in Step 224) is found in a tracked partial concept list. If the partial concept record is not found within the partial concept list, the engine 100 creates a new active partial concept record at Step 230. The engine 100 will add the new keyword and its heuristic segmentation index to the partial concept record at Step 232.

When a partial concept record is found, the keyword and its heuristic segmenation index is stored in the partial concept record at Step 234. The engine 100 creates a growing list of partial concepts as each new word is read from the text.

As each keyword is found and added to the partial concept list, the other keywords are checked for scope (still within the allowable cumulative size threshold). Any keywords that are out of scope are deleted from the PC record at Step 236.

The engine 100 checks the partial concept for completeness at Step 238. If the partial concept is complete, the engine 100 will mark or label the partial concept as complete at Step 240. Completeness occurs when all keywords are found and/or are found in the required order. Completed concept records become inactive and are closed to further keyword modifications.

If a partial concept is marked as complete but contains keywords that are still in scope (within the valid range) then the engine 100 will keep the concept active in case more keywords are found.

If all of the keywords in a completed concept record are out of scope, then the engine will mark it as closed. When the partial concept is closed, no new keywords can be added. Additionally, a new partial concept record will be created if subsequent keywords are found.

When the engine 100 finds a keyword that is already in the partial concept list, the keyword can be added to the existing list. This provides a permutation of more than one concept out of the collection of within-scope keywords.

As shown in FIG. 3, the engine 100, shown in FIG. 1, can perform an optional sub-set concept check at 242. The sub-set concept check can be used to identify nested concepts within an ordered (in the text) arrangement of concepts. Nested concepts can be identified by comparison after the building and pruning phase because the starting points and ending points of each concept are known.

When a concept record is at the point of completion, a check can be made to the previous completed concept records to see if any completed concept is a potential subset concept (child). The beginning and the ending of a child fall within the parent within a normal co-ordinate system. The engine 100 can iterate through the list to check to see whether a smaller concept is within a larger concept. This function can proceed until an out-of-range condition is found.

The engine 100 will mark the child as a potential subset concept of the larger parent. Even though a parent concept is not complete at this point, the pointer should still be set. The pointers can be removed if the parent never materializes.

At the end of Step 242, the engine 100 obtain a list of completed concepts for exporting. The engine 100 will also obtain links of nested concepts to their parents, as well as a list of associated co-ordinates and cumulative segmentation scores.

As shown in FIG. 3, the engine 100 will determine whether it has reached the end of the input text at Step 244. If the engine 100 has not reached the end of input text, the engine 100 will return to Step 212. If the engine 100 has reached the end of input text, the engine 100 can perform an optional negation check at Step 246.

At Step 246, negator expression are located. The radius of influence for the negator expression are known by the valid cumulative co-ordinates associated therewith. Any negatable concept that falls in a negation range is negated by the engine 100 at Step 246.

Figure 4:
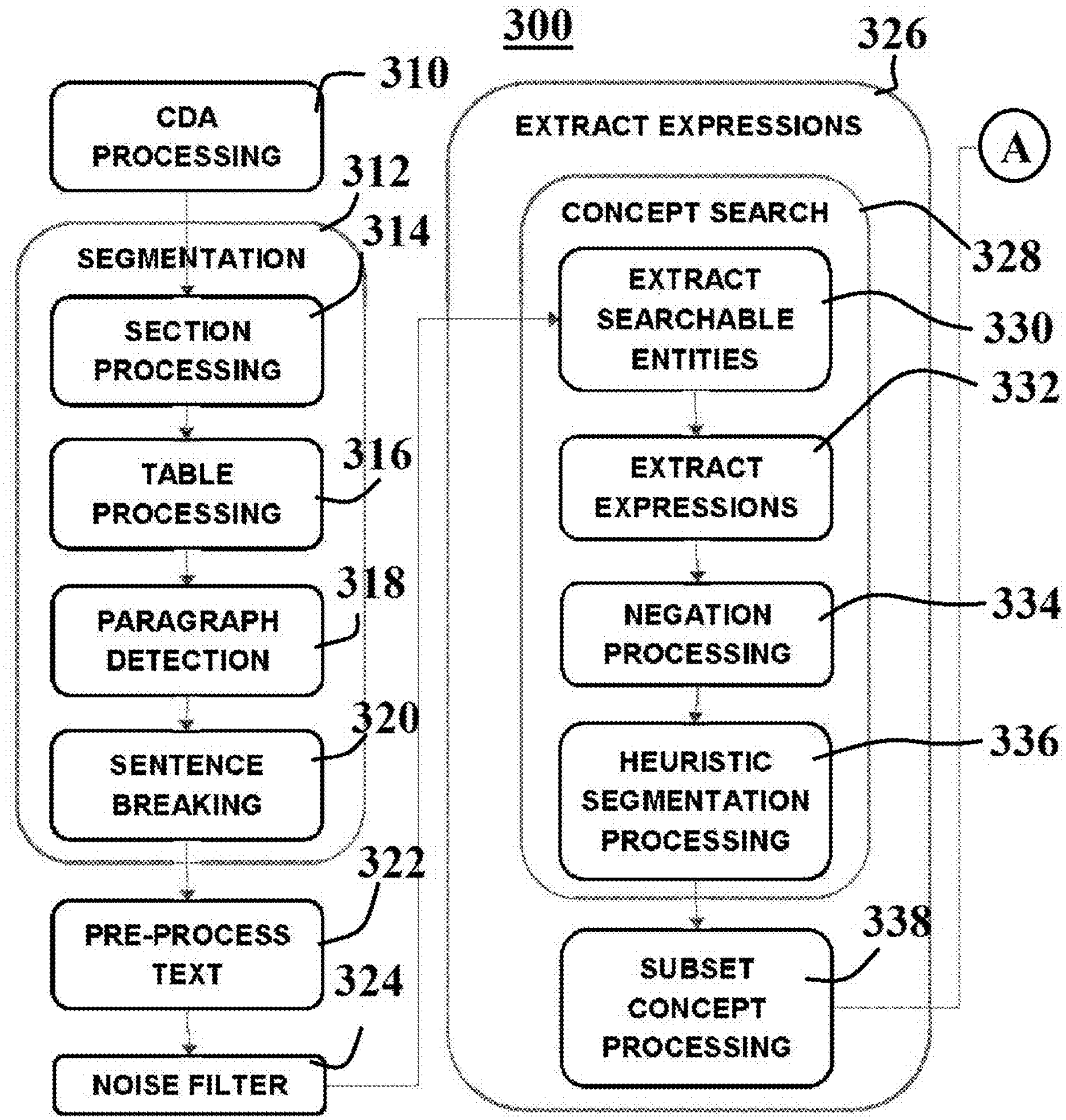
FIGS. 4-5 is a flowchart illustrating the execution of artificial intelligence engine shown in FIG. 1.
Figure 5:
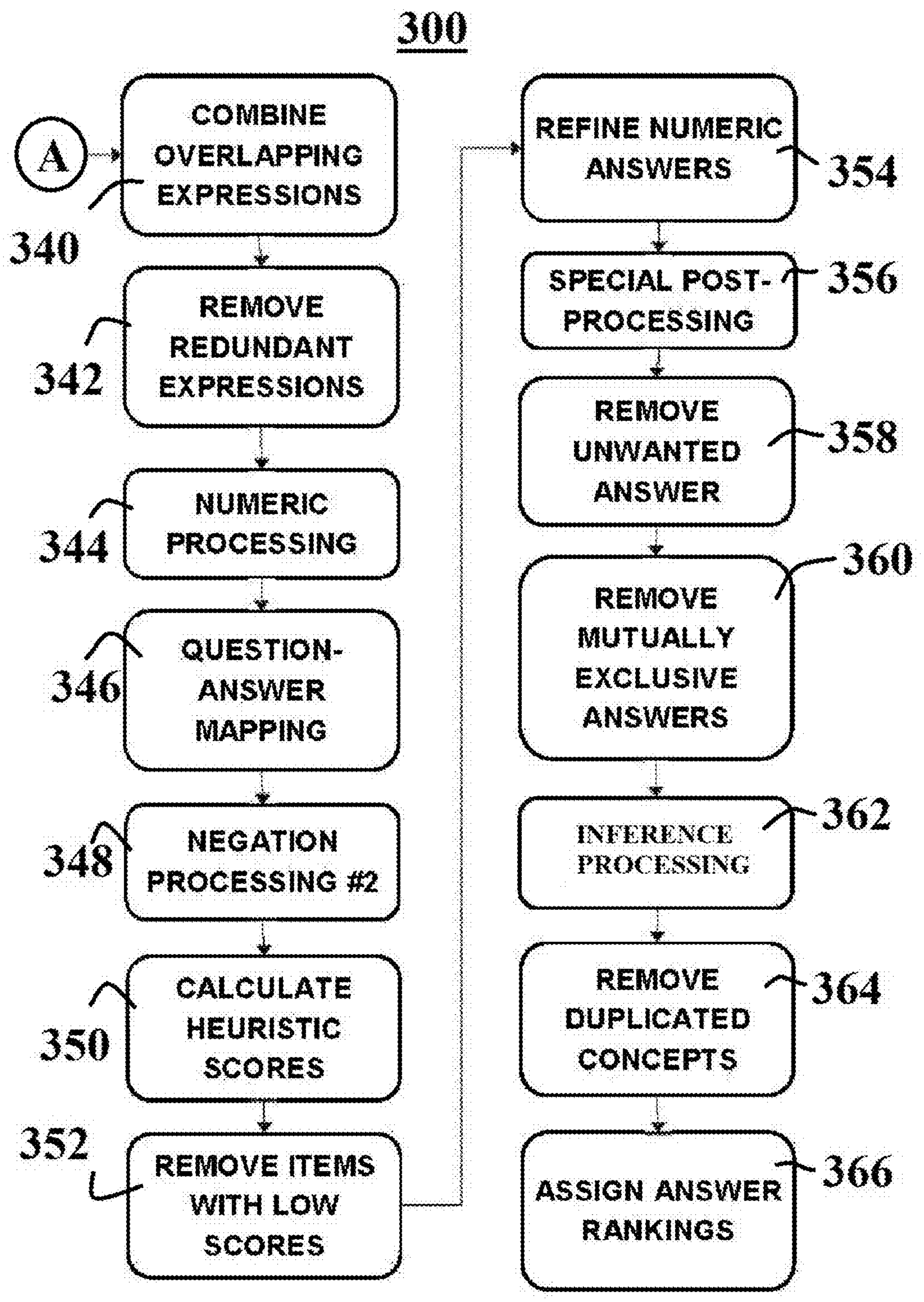

Referring now to FIGS. 4-5 with continuing reference to the foregoing figures, another process, generally designated by the numeral 300, for operating the engine 100, shown in FIG. 1, is shown. In this exemplary embodiment, the process 300 begins with Clinical Document Architecture (CDA) processing at Step 310. CDA is an XML-based markup standard intended to specify the encoding, structure and semantics of clinical documents for exchange.

At Step 312, the engine 100 can perform segmentation. The segmentation step includes section processing at Step 314, table processing at Step 316, paragraph detection at Step 318, and sentence processing at Step 320. The engine 100 will also pre-process text at Step 322 and apply a noise filter at Step 324. Steps 310-324 produce a document that is suitable for deep concept searching.

As shown in FIG. 4, once the engine 100 has completed Steps 310-324, the engine 100 will extract expressions at Step 326. The extraction of expressions begins with a concept search at Step 328. The concept search begins with the extraction of searchable entities at Step 330 from the document that was subject to Steps 310-324.

Once the searchable entities have been extracted at Step 330, the engine 100 will extract expressions at Step 332, perform negation operations at Step 334, and heuristic segmentation processing at Step 336 to complete the concept search at Step 328. Then, the engine 100 will perform subset concept processing at Step 338 to compete the extraction of expressions at Step 326.

As shown in FIG. 5, the engine 100 will combine overlapping expressions at Step 340. Then, the engine 100 will remove redundant expressions at Step 342 and perform numeric processing at Step 344. The engine 100 performs question-answer mapping at Step 346 followed by a second round of negation processing at Step 348.

The engine 100 calculates heuristic scores at Step 350 and removes items with low scores at Step 352. The engine 100 will refine numeric answers at Step 354 and perform special post-processing at Step 356. The engine 100 will remove unwanted answers at Step 358 and mutually exclusive answers at Step 360.

The engine 100 performs inference processing at Step 362. The inference processing of Step 362 can be performed using rules-based processing performed by a C Language Integrated Production System (CLIPS) processor. The engine 100 removes duplicated concepts at Step 364 and assigns answer rankings at Step 366 to complete the process 300. CLIPS is a rule-based programming language useful for creating expert systems and other programs where a heuristic solution is easier to implement and maintain than an algorithmic solution. CLIPS was originally developed at NASA's Johnson Space Center.

The heuristic score calculation at Step 350 involves evaluating the validity or relevance of expressions (involving phrases, keywords, or other textual units) extracted from text bodies. The heuristic score calculation is an adaptable approach to assess the confidence in the validity of expressions identified in text that can be adjusted, dynamically, to varying contexts and can incorporate multiple dimensions of evaluation.

The heuristic score calculation at Step 350 is designed to evaluate expressions based on a composite of independently operating heuristic modules, each contributing to a cumulative confidence score that reflects the validity of an expression. The heuristic modules can have varying characteristics/functionalities. An expression can be a semantic expression. An expression can represents different ways through which concepts can be represented in a text. An expression can contain one or more searchable entities.

In some embodiments, the heuristic score calculation at Step 350 can involve the use of a fixed-weight assignment module. Each heuristic module has a predetermined, fixed weight assigned to it. This weight represents the relative importance or influence of each module's score compared to the scores provided by the other heuristic modules within the system.

In other embodiments, the heuristic score calculation at Step 350 can involve the use of score production. In such embodiments, each heuristic module is responsible for producing a score within the range of 0 to 1. This score represents the estimation by the module of the probability that the expression is valid or applicable in the given context. A score closer to 1 indicates a higher probability of validity, while a score closer to 0 suggests a lower probability.

In yet other embodiments, the heuristic score calculation at Step 350 can involve variable weight production. In such embodiments, each heuristic module can also produce an optional variable weight to reflect the confidence level of the score they generate for the expression. (A default value is used when the dynamic variable weight is not produced by the module.)

The variable weight production can serve two primary functions. First, the variable weight allows dynamic adjustments to the weight of a heuristic module based on specific conditions of the text being evaluated. If the reliability of the score produced by the module is deemed to be low, the module's influence on the final heuristic score can be decreased by reducing the variable weight. For example, if one heuristic score module relies on the constituent grammar parse tree to produce a score for the expression, and the confidence value of the constituent parse tree is low, a low variable weight can be produced and thereby lowering the influence of this heuristic score module in the overall score.

Second, the variable weights can potentially be utilized to determine the overall confidence of the aggregated heuristic score. This confidence value provides an additional layer of insight, indicating how reliable or certain the system is about the final score it has produced.

The operational mechanism of the heuristic scoring system, the heuristic score calculation that produces the heuristic score at Step 350, involves the independent evaluation of expressions by each module, followed by the aggregation of these evaluations. The engine 100, shown in FIG. 1, combines the individual scores from all components, each adjusted according to its fixed and (optionally) variable weights, to produce a total heuristic score. This score reflects the collective judgment of all components regarding the validity of the expression.

The following formula is used to aggregate the results from each heuristic score module to produce an overall score value for the expression:

$$\text{Overall Score} = \frac{\sum_{i=1}^{a} w_i v_i s_i}{\sum_{i=1}^{a} w_i v_i}$$

where $w_i$ is the fixed weight of a heuristic score module; $v_i$ is the variable weight (determined at run-time) of the heuristic score module; $s_i$ is the score of the expression produced by the heuristic score module; and $\alpha$ is the total number of heuristic score modules.

By adapting the weights and evaluation criteria of each scoring module, this heuristic scoring system can be tailored to fit the specific requirements of different applications or domains, making it a versatile tool in the realm of natural language processing.

Figure 6:
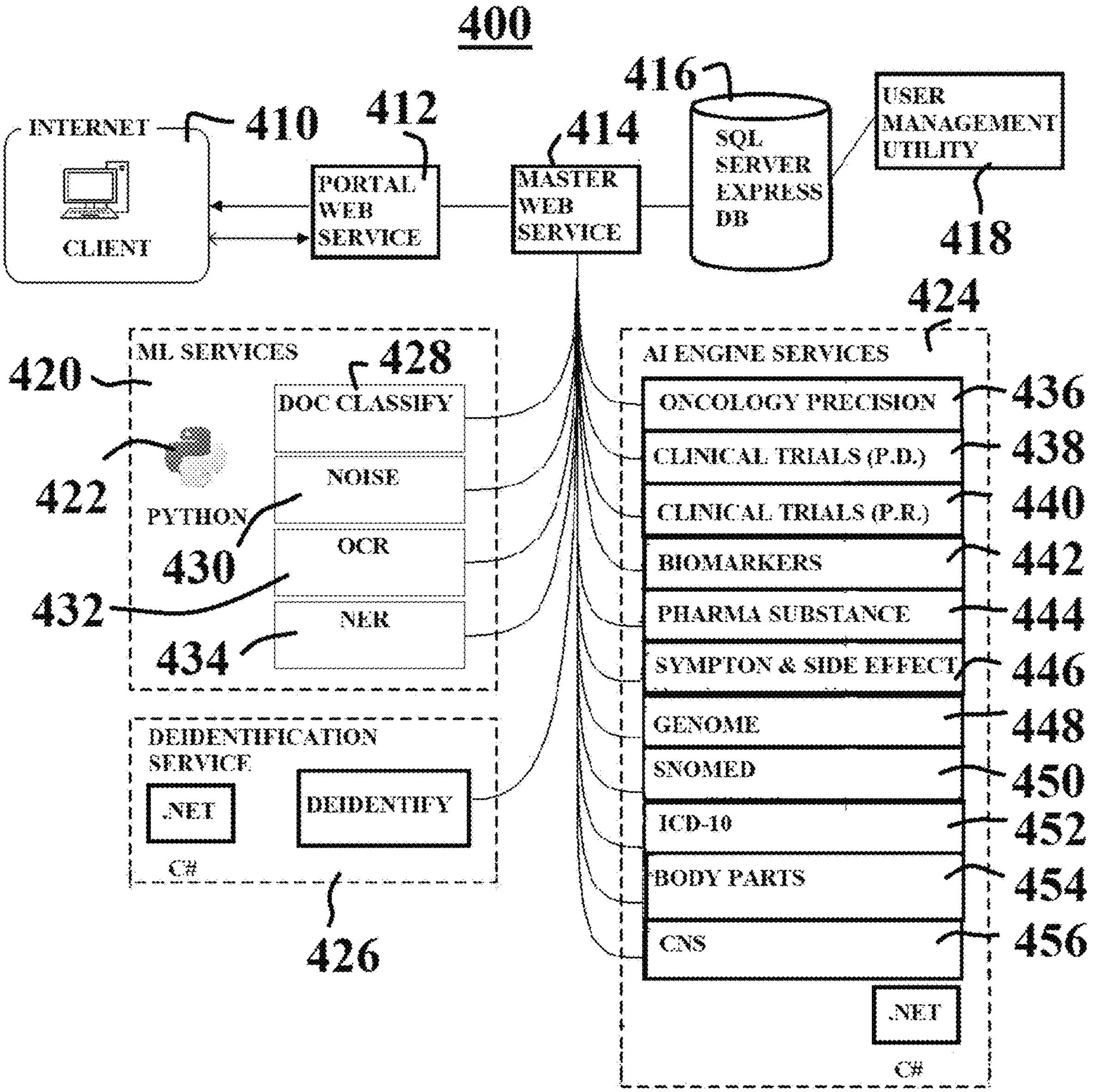
FIG. 6 is an exemplary system in accordance with the subject disclosure.

Referring now to FIG. 6 with continuing reference to the foregoing figures, an exemplary operating environment, generally designated with the numeral 400, is shown. The operating environment 400 includes an internet client device 410, portal web service 412, master web service 414, a Structured Query Language (SQL) database 416, and a user management utility 418.

The internet client device 410 connects to the portal web service 412 to exchange information therebetween. The internet client device 410 can be any type of computing device, including a smartphone, a handheld computer, a mobile device, a laptop, a tablet, a PC, or any other computing device.

In some embodiments, the portal web service 412 can be part of cloud, which is a network of remote servers hosted on the Internet that is used to store, manage, and process data in place of local servers or personal computers. In other embodiments, the portal web service 412 need not be hosted in the cloud, and can instead comprise part of any suitable network (e.g., an enterprise network, local area network, or the like) and accessed by the internet client device 410 client devices connected to such network.

The portal web service 412 can connect the internet client device 410 to master web service 414. The master web service 414 can host machine language services 420 that run on Python language 422, artificial intelligence services 424, and a de-identification service 426.

The master web service 414 connects to the SQL database 416 and the user management utility 418. In this exemplary embodiment, the SQL database 416 is an SQL server express database. The user management utility 418 can manage user access, store user profiles, and monitor user service.

As shown in FIG. 6, the machine language services 420 can include document classification services 428, noise detection services 430, optical character recognition (OCR) services 432, and named entity recognition (NER) services 434.

The artificial intelligence services 424 include information relating to oncology precision 436, clinical trials for trial protocol documents 438, clinical trials for pathology reports 440, biomarkers 442, pharma substance 444, symptoms and side effects 446, genome 448, SNOMED-related information 450, International Classification of Diseases, Tenth Revision (ICD-10)-related information 452, information relating to body parts 454, and central nervous system (CNS)-related information 456. SNOMED-related information includes a systematically organized computer-processable collection of medical terms providing codes, terms, synonyms and definitions used in clinical documentation and reporting.

Figure 7:
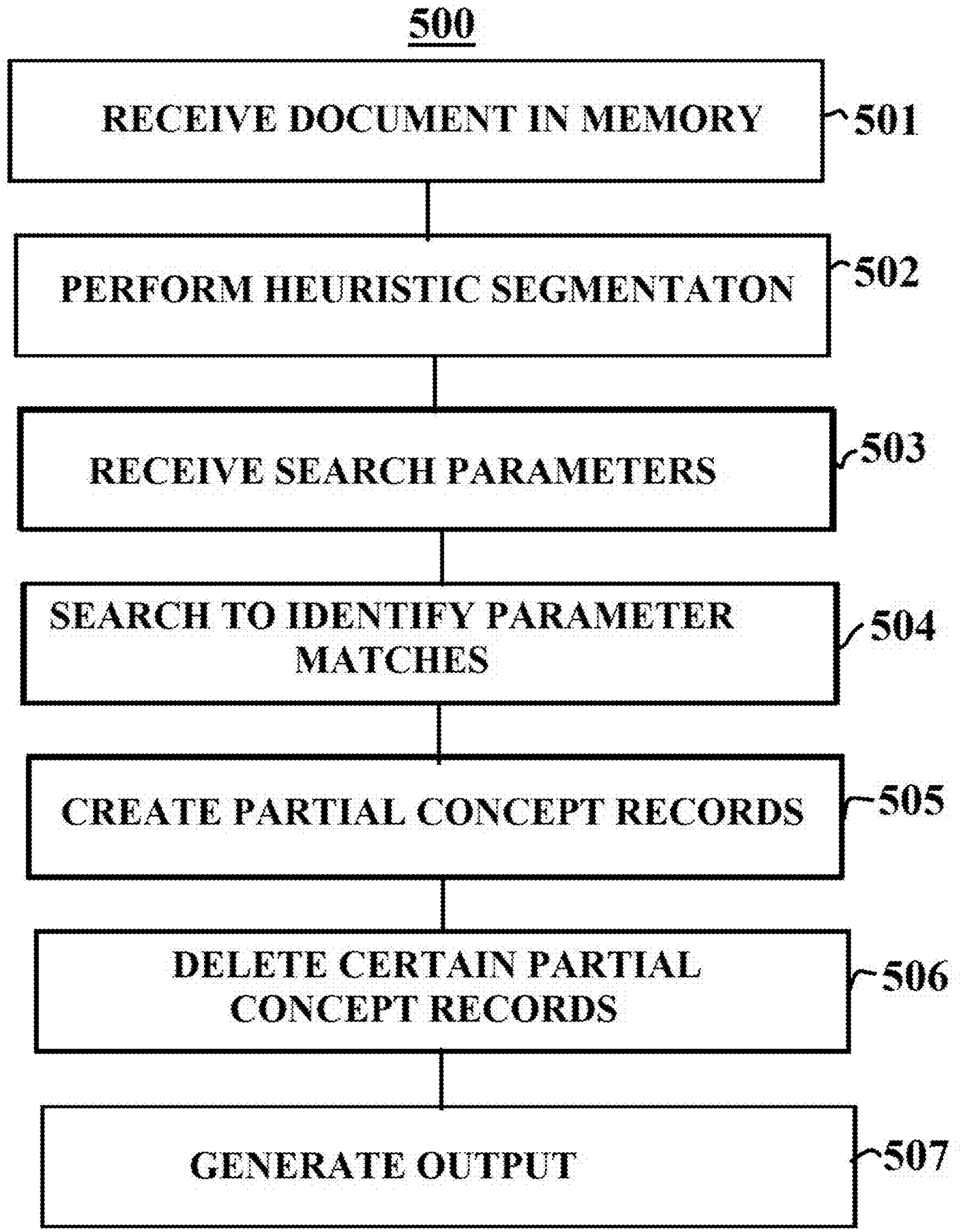
FIG. 7 is another exemplary process illustrating a concept search module in accordance with the subject disclosure.

Referring to FIG. 7 with continuing reference to the foregoing figures, another exemplary process, generally designated by the numeral 500, is shown. The exemplary process 500 can be performed by an artificial intelligence engine, such as artificial intelligence engine 100 shown in FIG. 1. The process 500 can be performed within operating environment 400 shown in FIG. 6.

At 501, a document is received in memory. In this exemplary embodiment, the document can be the text document 116 shown in FIG. 1.

At 502, a tokenization operation is performed on the document to divide the document into a plurality of word tokens, and to assign a heuristic segmentation index to each of the plurality of word tokens. In this exemplary embodiment, the engine 100 shown in FIG. 1 performs the heuristic segmentation operation on the raw text 116 within the first stage 110. An exemplary map is shown in FIG. 2.

At 503, an input text having an expression with at least one search parameter is received through input into the system. It should be understood that the search parameter can be a number, a phrase, a textual unit and/or a keyword in this exemplary embodiment.

At 504, at least one of the tokenized text and the input text is searched to identify a parameter match when the at least one search parameter is located in the input text. In this exemplary embodiment, the engine 100 shown in FIG. 1 performs the search to identify a parameter match during the first stage 110.

At 505, a partial concept record is created on a partial concept list for the search parameter match with each partial concept record having the corresponding score and the corresponding at least one heuristic segmentation index for the one of the plurality of word tokens for which the search parameter match is located. In this exemplary embodiment, the creation of the partial concept list by the engine 100 shown in FIG. 1 is illustrated in Step 228 to Step 240 in FIG. 3.

At 506, each partial concept record on the partial concept list is compared to delete a partial concept record when the at least one coordinate that corresponds to the partial concept falls outside of a dynamic window to produce a pruned partial concept list. In this exemplary embodiment, the pruning of the partial concept list by the engine 100 shown in FIG. 1 is illustrated in Step 226 in FIG. 3.

At 507, output indicating that a concept match has occurred is generated when the pruned partial concept list includes at least one partial concept record for each of the at least one search parameters. In this exemplary embodiment, the output can be shown on internet client device 410 in FIG. 6.

Exemplary Computing Systems

Figures 8, 9:
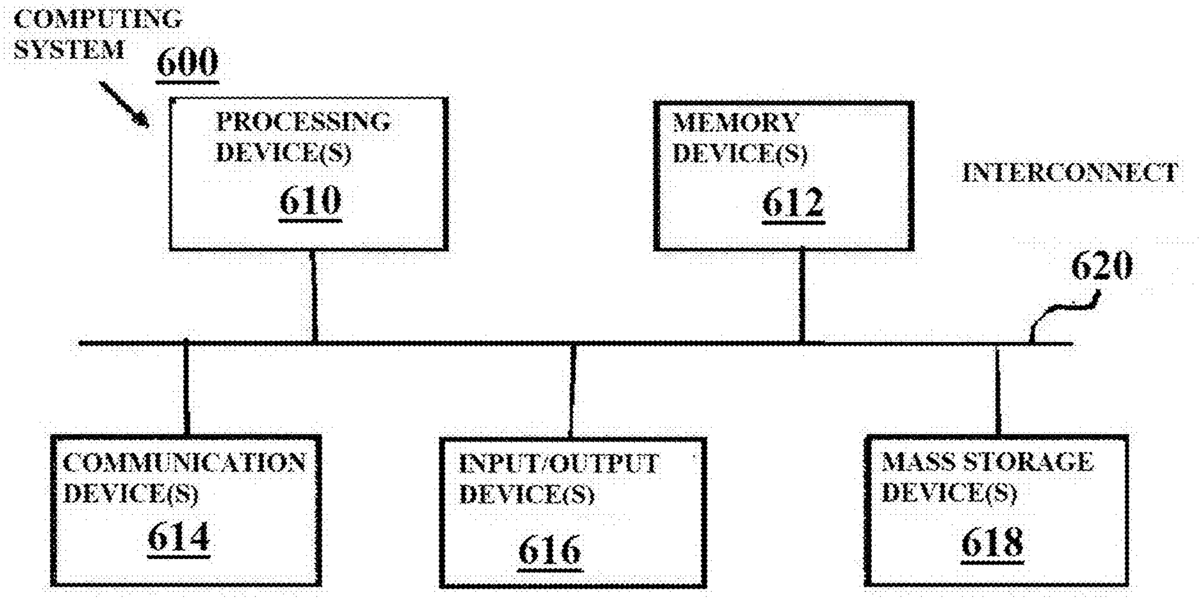
FIG. 8 is an exemplary computer system in accordance with the subject disclosure.
FIG. 9 illustrates exemplary text input for a heuristic scoring example in accordance with the subject disclosure.

Referring now to FIG. 8 with continuing reference to the forgoing figures, an exemplary computing system, generally designated by the numeral 600, to host the artificial intelligence agent 100 shown in FIG. 1, to perform the process 200 shown in FIG. 3, to perform the process 300 shown in FIGS. 4-5, to be used within the operating environment 400 shown in FIG. 6, and/or to perform the process 500 shown in FIG. 7.

The hardware architecture of the computing system 600 that can be used to implement any one or more of the functional components described herein. In some embodiments, one or multiple instances of the computing system 600 can be used to implement the techniques described herein, where multiple such instances can be coupled to each other via one or more networks.

The illustrated computing system 600 includes one or more processing devices 610, one or more memory devices 612, one or more communication devices 614, one or more input/output (I/O) devices 616, and one or more mass storage devices 618, all coupled to each other through an interconnect 620. The interconnect 620 can be or include one or more conductive traces, buses, point-to-point connections, controllers, adapters, and/or other conventional connection devices. Each of the processing devices 610 controls, at least in part, the overall operation of the processing of the computing system 600 and can be or include, for example, one or more general-purpose microprocessors, digital signal processors (DSPs), mobile application processors, microcontrollers, application-specific integrated circuits (ASICs), programmable gate arrays (PGAs), or the like, or a combination of such devices.

Each of the memory devices 612 can be or include one or more physical storage devices, which can be in the form of random access memory (RAM), read-only memory (ROM) (which can be erasable and programmable), flash memory, miniature hard disk drive, or other suitable type of storage device, or a combination of such devices. Each mass storage device 618 can be or include one or more hard drives, digital versatile disks (DVDs), flash memories, or the like. Each memory device 612 and/or mass storage device 618 can store (individually or collectively) data and instructions that configure the processing device(s) 610 to execute operations to implement the techniques described above.

Each communication device 614 can be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 610, each I/O device 616 can be or include a device such as a display (which can be a touch screen display), audio speaker, keyboard, mouse or other pointing device, microphone, camera, etc. Note, however, that such I/O devices 616 can be unnecessary if the processing device 610 is embodied solely as a server computer.

In the case of a client device, the communication devices(s) 614 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 614 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 612). A processor (e.g., processing device(s) 610) is "configured to execute a software program" when at least one value associated with the software program is stored in a register that is readable by the processor. In some embodiments, routines executed to implement the disclosed techniques can be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 610), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 612).

EXAMPLES

Example 1

In Example 1, a simple example of concept growing and pruning is shown. Example 1 includes three concepts within a lexical knowledge base: "Squamous cell carcinoma"; "Carcinoma"; and "Basal cell carcinoma". There is also a concept called "invasive carcinoma" that is defined in the lexical knowledge base but not in the text. Example 1 also includes three segmenters and scoring: "Period=50"; "Comma=10"; and "But=30". The cutoff threshold equals 50.

The text to be processed is:

"Carcinoma is often found on the skin. Both Basal and squamous types can appear on skin, but of the two, squamous cell carcinoma is more significant."

The deep concept search progress is shown in Table 1.

The deep concept search resulted in a finding of three completed concepts:

2×[carcinoma] and [squamous cell carcinoma] and carcinoma:

127 a subset of two other concepts.

TABLE 1

Deep Concept Search Progress.

| | Focus | C-Score | Action | Tracked Concepts (PC) list |
|---|---|---|---|---|
| 1 | Carcinoma | 1 | Found a keyword - create new PC records. Mark concept as complete. | [carcinoma: 1] [basal cell carcinoma: 1] [squamous cell carcinoma: 1] [invasive carcinoma: 1] |
| 2 | Is | 2 | . . . | |
| 3 | Often | 3 | . . . | |
| 4 | Found | 4 | . . . | |
| 5 | On | 5 | . . . | |
| 6 | The | 6 | . . . | |
| 7 | Skin | 7 | . . . | |
| 8 | . | 58 | Remove out-of-scope keywords and PC | [carcinoma: 1] ~~[basal cell carcinoma:1]~~ ~~[squamous cell carcinoma:1]~~ ~~[invasive carcinoma:1]~~ |
| 9 | Both | 59 | . . . | |
| 10 | Basal | 60 | Found a keyword - add to PC record. | [carcinoma: 1] [basal: 60 cell carcinoma] |
| 11 | And | 61 | . . . | |

TABLE 1-continued

Deep Concept Search Progress.

| | Focus | C-Score | Action | Tracked Concepts (PC) list |
|---|---|---|---|---|
| 12 | Squamous | 62 | Found a keyword - add to PC record | [carcinoma: 1] [basal: 60 cell carcinoma] [squamous: 62 cell carcinoma] |
| 13 | Types | 63 | . . . | |
| 14 | can | 64 | . . . | |
| 15 | Appear | 65 | . . . | |
| 16 | On | 66 | . . . | |
| 17 | Skin | 67 | . . . | |
| 18 | , | 78 | . . . | |
| 19 | But | 109 | . . . | |
| 20 | Of | 110 | . . . | |
| 21 | the | 112 | . . . | |
| 22 | Two | 113 | . . . | |
| 23 | , | 124 | . . . | |
| 24 | Squamous | 125 | Found a keyword - add to PC record, prune old keywords (remove squamous: 62), add new keyword squamous: 125 | [carcinoma: 1] [basal: 60 cell carcinoma] [squamous: 125 cell carcinoma] |
| 25 | Cell | 126 | Found a keyword - found PC records. Prune (remove basal: 60), add cell: 126 | [carcinoma: 1] [basal cell: 126 carcinoma] [squamous: 125 cell: 126 carcinoma |
| 26 | Carcinoma | 127 | Found keyword - create new PC record - mark as complete. Add to PC records. Add carcinoma: 127 and mark concept as complete | [carcinoma: 1] [carcinoma: 127] [basal cell: 126 carcinoma: 127] [squamous: 125 cell: 126 carcinoma: 127] [invasive carcinoma: 1] |
| 27 | is | 128 | . . . | |
| 28 | more | 128 | . . . | |
| 29 | Significant | 130 | . . . | |
| 30 | . | 181 | Remove out-of-scope PCs | [carcinoma: 1] [carcinoma: 127] ~~[basal cell:126 carcinoma:127]~~ [squamous: 125 cell: 126 carcinoma: 127] ~~[invasive carcinoma:1]~~ |

Example 2

In Example 2, an exemplary heuristic score calculation is shown. Example 2 includes two heuristic score modules: Density and Dependency. The calculation uses the text input with the heuristic co-ordinates shown in FIG. 9.

The preliminary search algorithm identifies expressions in the text. The heuristic score modules calculates the various heuristic weights and scores, which is shown in Table 2.

The density heuristic module has been assigned a fixed weight of 1. Since it does not produce a variable weight, a default value of 1 is adopted. Since the word "negative" and "S100" is relatively far apart, a lower density score of 0.35 is produced for this expression.

The dependency heuristic module has been assigned a fixed weight of 5. Since sentences of similar structure heavily contributes to the training of the dependency heuristic module, it produces a high variable weight of 0.95, indicating a high confidence level in the precision of the result it generates. A score of 1 is produced for this expression because of the strong relationship between the adjective "negative" and the biomarker "S100" in the sentence.

The overall heuristic score for this expression is calculated as follows:

$$\text{Overall Score} = \frac{w_1 v_1 s_1 + w_2 v_2 s_2}{w_1 v_1 + w_2 v_2} = \frac{(1)(1)(0.35) + (5)(0.95)(1)}{(1)(1) + (5)(0.95)} = 0.8869$$

TABLE 2

Heuristic Score Calculations

| | Density Heuristic Module | | | Dependency Heuristic Module | | | |
|---|---|---|---|---|---|---|---|
| Expression | Fixed Weight | Variable Weight | Score | Fixed Weight | Variable Weight | Score | Overall Heuristic Score |
| $\text{negative}_{(5)}$ $\text{S100}_{(19)}$ | 1 | 1 | 0.35 | 5 | 0.95 | 1 | 0.826 |
| $\text{S100}_{(19)}$ $\text{positive}_{(29)}$ | 1 | 1 | 0.55 | 5 | 0.95 | 0 | 0.096 |
| $\text{preliminary}_{(58)}$ $\text{report}_{(68)}$ | 1 | 1 | 0.55 | 5 | 0.30 | 0.5 | 0.600 |

Supported Features and Embodiments

Supported embodiments can provide various attendant and/or technical advantages in terms of deep search concepts systems and methods. Supported embodiments include a method performed by one or more processors of a system, the method comprising: receiving a document in memory; performing a tokenization operation on the document to divide the document into a plurality of word tokens, and to assign a heuristic segmentation index to each of the plurality of word tokens; receiving an expression having at least one search parameter through input into the system; searching the input text (and/or the tokenized text) to identify a parameter match when any of the search parameters are located in the input text; creating (when there are no existing partial concept for this expression) or updating (when an existing partial concept record is found) a partial concept record on a partial concept list for the search parameter match with each partial concept record having corresponding heuristic segmentation indices of the matched search parameter; evaluating each partial concept record on the partial concept list to delete a partial concept record for each one of the plurality of segments when the difference between the maximum heuristic segmentation index of the word token and the minimum heuristic segmentation index of the word token exceeds a predetermined threshold; and generating output indicating that a concept match has occurred when a partial concept has been completed and matches all the defined search parameters of the concept.

Supported embodiments include the foregoing method, wherein the search parameter can be a word, a number, or a phrase (matched by a pattern description).

Supported embodiments include any of the foregoing methods, further comprising: identifying any nested concept within the partial concept list; and assigning at least one reference to the at least one nested concept.

Supported embodiments include any of the foregoing methods, wherein the index for each of the plurality of word tokens consist of the sum of the word token count and the cumulative heuristic segmentation weights.

Supported embodiments include any of the foregoing methods, further comprising: determining a maximum cumulative concept size for each of the plurality of partial concepts; and deleting any searchable entity for one of the plurality of partial concepts when the difference between the heuristic segmentation index of any searchable entity and the heuristic segmentation index of the current searchable entity exceeds a predetermined threshold.

Supported embodiments include any of the foregoing methods, wherein the heuristic segmentation index is the sum of the cumulative word count and the cumulative weight of the heuristic segmenters found prior to the word token.

Supported embodiments include any of the foregoing methods, further comprising: ranking each of the completed concept records on the pruned partial concept list based upon the heuristic score of each of the completed concept records.

Supported embodiments include any of the foregoing methods, further comprising: deleting a completed concept record for one of the plurality of segments based upon a rule within a knowledge base.

Supported embodiments include any of the foregoing methods, further comprising determining the heuristic score with a heuristic module.

Supported embodiments include any of the foregoing methods, further comprising: negating a completed concept record for one of the plurality of segments when the concept falls inside of a predetermined range within a negative expression.

Supported embodiments include a system, comprising: one or more processors; and at least one memory coupled to the one or more processors and storing instructions that, when executed by the one or more processors, cause the system to perform operations comprising: receiving a document in the at least one memory; performing a tokenization operation on the document to divide the document into a plurality of word tokens, and to assign a heuristic segmentation index to each of the plurality of word tokens; receiving an expression having at least one search parameter through input into the system; searching the input text (and/or the tokenized text) to identify a parameter match when any of the search parameters are located in the input text; creating (when there are no existing partial concept for this expression) or updating (when an existing partial concept record is found) a partial concept record on a partial concept list for the search parameter match with each partial concept record having corresponding heuristic segmentation indices of the matched search parameter; evaluating each partial concept record on the partial concept list to delete a partial concept record for each one of the plurality of segments when the difference between the maximum heuristic segmentation index of the word token and the minimum heuristic segmentation index of the word token exceeds a predetermined threshold; and generating output indicating that a concept match has occurred when a partial concept has been completed and matches all the defined search parameters of the concept.

Supported embodiments include the foregoing system, wherein the search parameter can be a word, a number, or a phrase (matched by a pattern description).

Supported embodiments include any of the foregoing systems, wherein the operations further comprise: identifying any nested concept within the partial concept list; and assigning at least one reference to the at least one nested concept.

Supported embodiments include any of the foregoing systems, wherein the index for each of the plurality of word tokens consist of the sum of the word token count and the cumulative heuristic segmentation weights.

Supported embodiments include any of the foregoing systems, wherein the operations further comprise: determining a maximum cumulative concept size for each of the plurality of partial concepts; and deleting any searchable entity for one of the plurality of partial concepts when the difference between the heuristic segmentation index of any searchable entity and the heuristic segmentation index of the current searchable entity exceeds a predetermined threshold.

Supported embodiments include any of the foregoing systems, wherein the heuristic segmentation index is the sum of the cumulative word count and the cumulative weight of the heuristic segmenters found prior to the word token.

Supported embodiments include any of the foregoing systems, wherein the operations further comprise: ranking each of the completed concept records on the pruned partial concept list based upon the heuristic score of each of the completed concept records.

Supported embodiments include any of the foregoing systems, wherein the operations further comprise: deleting a completed concept record for one of the plurality of segments based upon a rule within a knowledge base.

Supported embodiments include any of the foregoing systems, wherein the operations further comprise: determining the heuristic score with a heuristic module.

Supported embodiments include any of the foregoing systems, wherein the operations further comprise: negating a completed concept record for one of the plurality of segments when the concept falls inside of a predetermined range within a negative expression.

Supported embodiments include a method performed by one or more processors of a system, the method comprising: receiving a document in memory; performing a tokenization operation on the document to divide the document into a plurality of word tokens, to assign at least one heuristic segmentation index to each of the plurality of word tokens, and to form a tokenized text; receiving, through input into the system, an input text having an expression with at least one search parameter therein with the at least one search parameter being one of a plurality of partial concept search parameters; searching at least one of the tokenized text and the input text for a parameter match when the at least one search parameter is located in the input text; identifying at least one of the plurality of word tokens and the assigned at least one heuristic segmentation index that corresponds to the parameter match; searching, on a partial concept list, for a partial concept record for the expression; creating a partial concept record on the partial concept list for the parameter match, the at least one of the plurality of word tokens, and the associated at least one heuristic segmentation index when there is no existing partial concept for the expression; updating the partial concept record on the partial concept list for the parameter match, the at least one of the plurality of word tokens, and the associated at least one heuristic segmentation index when an existing partial concept record is found; and generating output indicating that a concept match has occurred when the partial concept list has a partial concept record for each of the plurality of partial concept search parameters; whereby the concept match corresponds to a completed concept.

Supported embodiments include the foregoing method, wherein the at least one search parameter selected from the group consisting of a word, a number, and a phrase.

Supported embodiments include any of the foregoing methods, further comprising: identifying at least one nested concept within the partial concept list; and assigning at least one reference to the at least one nested concept.

Supported embodiments include any of the foregoing methods, wherein the at least one heuristic segmentation index for each of the plurality of word tokens is the sum of the word token count and the cumulative heuristic segmentation weights.

Supported embodiments include any of the foregoing methods, further comprising: determining a maximum cumulative concept size.

Supported embodiments include any of the foregoing methods, wherein the at least one heuristic segmentation index for each of the plurality of word tokens is the sum of the cumulative word count and the cumulative weight of the heuristic segmenters found prior to the word token.

Supported embodiments include any of the foregoing methods, wherein the completed concept is one of a plurality of completed concepts, further comprising: ranking each of the completed concepts within the plurality of completed concepts.

Supported embodiments include any of the foregoing methods, further comprising: pruning the plurality of completed concepts.

Supported embodiments include any of the foregoing methods, further comprising: deleting one of the plurality of completed concepts based upon a rule within a knowledge base.

Supported embodiments include any of the foregoing methods, further comprising: evaluating each partial concept record on the partial concept list; and deleting one of the partial concept records when the difference between the maximum heuristic segmentation index for the one of the partial concept records and the minimum heuristic segmentation index for the one of the partial concept records exceeds a predetermined threshold.

Supported embodiments include any of the foregoing methods, further comprising: negating a completed concept record for one of the plurality of segments when the concept falls inside of a predetermined range within a negative expression.

Supported embodiments include a system, comprising: one or more processors; and at least one memory coupled to the one or more processors and storing instructions that, when executed by the one or more processors, cause the system to perform operations comprising: receiving a document in memory; performing a tokenization operation on the document to divide the document into a plurality of word tokens, to assign at least one heuristic segmentation index to each of the plurality of word tokens, and to form a tokenized text; receiving, through input into the system, an input text having an expression with at least one search parameter therein with the at least one search parameter being one of a plurality of partial concept search parameters; searching at least one of the tokenized text and the input text for a parameter match when the at least one search parameter is located in the input text; identifying at least one of the plurality of word tokens and the assigned at least one heuristic segmentation index that corresponds to the parameter match; searching, on a partial concept list, for a partial concept record for the expression; creating a partial concept record on the partial concept list for the parameter match, the at least one of the plurality of word tokens, and the associated at least one heuristic segmentation index when there is no existing partial concept for the expression; updating the partial concept record on the partial concept list for the parameter match, the at least one of the plurality of word tokens, and the associated at least one heuristic segmentation index when an existing partial concept record is found; and generating output indicating that a concept match has occurred when the partial concept list has a partial concept record for each of the plurality of partial concept search parameters; whereby the concept match corresponds to a completed concept.

Supported embodiments include the foregoing system, wherein the at least one search parameter selected from the group consisting of a word, a number, and a phrase.

Supported embodiments include any of the foregoing systems, further comprising: identifying at least one nested concept within the partial concept list; and assigning at least one reference to the at least one nested concept.

Supported embodiments include any of the foregoing systems, wherein the at least one heuristic segmentation index for each of the plurality of word tokens is the sum of the word token count and the cumulative heuristic segmentation weights.

Supported embodiments include any of the foregoing systems, wherein the at least one heuristic segmentation index for each of the plurality of word tokens is the sum of the cumulative word count and the cumulative weight of the heuristic segmenters found prior to the word token.

Supported embodiments include any of the foregoing systems, wherein the completed concept is one of a plurality of completed concepts, further comprising: ranking each of the completed concepts within the plurality of completed concepts.

Supported embodiments include any of the foregoing systems, further comprising: pruning the plurality of completed concepts by deleting one of the plurality of completed concepts based upon a rule within a knowledge base.

Supported embodiments include any of the foregoing systems, further comprising: evaluating each partial concept record on the partial concept list; and deleting one of the partial concept records when the difference between the maximum heuristic segmentation index for the one of the partial concept records and the minimum heuristic segmentation index for the one of the partial concept records exceeds a predetermined threshold.

Supported embodiments include any of the foregoing systems, further comprising: negating a completed concept record for one of the plurality of segments when the concept falls inside of a predetermined range within a negative expression.

Supported embodiments include a device, an apparatus, and/or means for implementing any of the foregoing systems, methods, or portions thereof.

The detailed description provided above in connection with the appended drawings is intended as a description of examples and is not intended to represent the only forms in which the present examples can be constructed or utilized. It is to be understood that the configurations and/or approaches described herein are exemplary in nature, and that the described embodiments, implementations and/or examples are not to be considered in a limiting sense, because numerous variations are possible.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system, comprising:

an internet client device; and a cloud server connected to the internet client device over a network;

wherein the cloud server has a portal web service and a master web server residing thereon with the portal web service connecting the internet client device to the master web server;

wherein the internet client device sends a document to the cloud server over the network, so that the master web server can perform a tokenization operation on the document to divide the document into a plurality of word tokens, to assign at least one heuristic segmentation index to each of the plurality of word tokens, and to form a tokenized text;

wherein the internet client device receives input for transmission to the cloud server over the network with the input having an expression with at least one search parameter therein with the at least one search parameter being one of a plurality of partial concept search parameters; searching at least one of the tokenized text and the input text for a parameter match when the at least one search parameter is located in the input text;

wherein the master web service identifies at least one of the plurality of word tokens and the assigned at least one heuristic segmentation index that corresponds to the parameter match;

wherein the master web service searches, on a partial concept list, for a partial concept record for the expression;

wherein the master web service creates a partial concept record on the partial concept list for the parameter match, the at least one of the plurality of word tokens, and the associated at least one heuristic segmentation index when there is no existing partial concept for the expression;

wherein the master web service evaluates each partial concept record on the partial concept list;

wherein the master web service deletes one of the partial concept records when the difference between the maximum heuristic segmentation index for the one of the partial concept records and the minimum heuristic segmentation index for the one of the partial concept records exceeds a predetermined threshold;

wherein the master web service updates the partial concept record on the partial concept list for the parameter match, the at least one of the plurality of word tokens, and the associated at least one heuristic segmentation index when an existing partial concept record is found;

wherein the master web service generates output indicating that a concept match has occurred when the partial concept list has a partial concept record for each of the plurality of partial concept search parameters; and wherein the master web service transmits the output over the network to the internet client device for display thereon;

whereby the concept match corresponds to a completed concept.

2. The system of claim 1, wherein the at least one search parameter selected from the group consisting of a word, a number, and a phrase.

3. The system of claim 1, wherein the master web service identifies at least one nested concept within the partial concept list; and wherein the master web service assigns at least one reference to the at least one nested concept.

4. The system of claim 1, wherein the at least one heuristic segmentation index for each of the plurality of word tokens is the sum of the word token count and the cumulative heuristic segmentation weights.

5. The system of claim 4, wherein the master web service determines a maximum cumulative concept size.

6. The system of claim 1, wherein the at least one heuristic segmentation index for each of the plurality of word tokens is the sum of the cumulative word count and the cumulative weight of the heuristic segmenters found prior to the word token.

7. The system of claim 1, wherein the completed concept is one of a plurality of completed concepts, so that the master web service can rank each of the completed concepts within the plurality of completed concepts.

8. The system of claim 7, wherein the master web service prunes the plurality of completed concepts.

9. The system of claim 8, wherein the master web service generates a pruned partial concept list.

10. The system of claim 7, wherein the master web service deletes one of the plurality of completed concepts based upon a rule within a knowledge base.

11. The system of claim 1, wherein the master web service negates a completed concept record for one of the plurality of segments when the concept falls inside of a predetermined range within a negative expression.

12. The system of claim 1, wherein the master web service utilizes one or more machine language services to perform the tokenization operation.

13. The system of claim 12, wherein the one or more machine language services include a document classification service, a noise detection service, an optical character recognition service, and a named entity recognition service.

14. The system of claim 1, wherein the master web service utilizes one or more artificial intelligence services to process raw text within the document.

15. The system of claim 1, wherein a database resides on the cloud server.

16. The system of claim 1, wherein a user management utility resides on the cloud server; and wherein the user management utility manages user access, stores user profiles, and monitor user services.

17. The system of claim 1, wherein the master web service includes a de-identification service.

18. The system of claim 1, wherein the output indicates that a concept match has occurred.

19. The system of claim 1, wherein the master web service utilizes an artificial intelligence engine to perform a concept search using at least one of an expression extraction, a negation operation and heuristic segmentation processing.

* * * * *